United States Patent [19]

Righini

[11] 3,803,369

[45] Apr. 9, 1974

[54] ACTIVE COUPLER FOR NODES OF BIDIRECTIONAL TWO-WIRE TRANSMISSION LINES

[76] Inventor: Placido Righini, Via Vandalino, 1, Turin, Italy

[22] Filed: Jan. 12, 1972

[21] Appl. No.: 217,091

[30] Foreign Application Priority Data

Mar. 23, 1971 Italy ................................ 67982/71

[52] U.S. Cl. ........................... 179/170 R, 179/1 CN

[51] Int. Cl. ............................................ H04b 3/36

[58] Field of Search ........ 179/170 R, 170 D, 170 T, 179/1 CN, 2.5 R, 2.5 A, 16 EC

[56] References Cited

UNITED STATES PATENTS

| | | | |
|---|---|---|---|
| 2,721,897 | 10/1955 | Schneckoloth | 179/2.5 R |
| 3,502,823 | 3/1970 | Gaunt | 179/170 T |

OTHER PUBLICATIONS

Conference Circuit, by J. Garcia and L. Riou, IBM Technical Disclosure Bulletin; vol. 9, No. 3 Aug., 1966 p. 264–265.

*Primary Examiner*—Kathleen H. Claffy
*Assistant Examiner*—Alan Faber

[57] ABSTRACT

An active coupler for nodes of bidirectional transmission lines, which comprises two amplifying units, one for each direction of transmission, connected to each other and connected, directly or through transformers to the branch lines and to the main line. The connection between the two amplifying units may realize a point with zero impedance, and the branch lines may be connected all in parallel to the point of zero impedance, so that the energy exchanges occur as a sum of currents, in a point of zero impedance, or said connection may realize a point of infinite impedance and the branch lines may be connected in series to said point of infinite impedance, so that the energy exchanges may occur as a sum of voltages in a point with infinite impedance.

3 Claims, 8 Drawing Figures

ACTIVE COUPLER FOR NODES OF BIDIRECTIONAL TWO-WIRE TRANSMISSION LINES

The present invention relates to an active coupler for nodes of bidirectional transmission lines, operating with two wires.

As known, it is impossible to connect directly in parallel a plurality of branch telephone lines with a main line, due to the drawbacks caused by impedance unmatching. It has been proposed to realize the connection by means of passive couplers, such as hybrids, resistance networks and the like, but the use of such passive couplers causes important losses which increase depending on the number of lines which branch off the main line.

In order to obviate these drawbacks, the Applicant has realized an active coupler to be inserted in a node, which allows to introduce a minimum attenuation between the main line and each branch line, and to have a high decoupling between the branch lines. The coupler according to the invention is characterized in that it comprises two amplifier units, one for each transmission direction, connected to each other and having one side having connected to the branch lines through transformers, if any, and the other side connected to the main line through a hybrid and through transformers, if any.

In a first embodiment of the invention, the active element in the coupler realizes a sum of currents in a point of negligible impedance. Said point is formed by the series connection of the input of one of the amplifier units with the output of the second amplifier unit, the point common to said amplifier units having negligible impedance; the branch lines are then connected in parallel with one another and with said point at negligible impedance, through their load resistors. The term "negligible impedance" as used therein denotes an impedance very low with respect to the 600 Ohm impedance normally used in telephone equipments, for instance an impedance of about 5 Ohms.

In a second embodiment, the active member realizes a sum of voltages in a point of very high impedance. Said point is formed by the parallel connection of the input of the first amplifier unit with the output of the second amplifier unit, the point common to said amplifiers having very high impedance; the branch lines are connected in series with one another and with the point of very high impedance. The term "very high impedance" as used herein denotes an impedance which is very high with respect to the 600 Ohm impedance normally used in telephone equipments, for instance an impedance of at least 60 Kiloohms.

A coupler of such a type has several advantage: firstly a right impedance matching between the main line and the branch lines is assured in both directions of transmission; further the insertion losses are very low and may be predetermined, and lastly the device is stable within safety limits, which are they too predeterminable, even in case of break or short circuit in one or more branch lines, the transmission equivalent between the main line and the still working branch lines being unchanged.

The coupling device according to the invention may be employed in telephone or telegraph networks, in tele-operation systems or in data transmission networks. It may be employed both in nodes where a plurality of lines branch off a line extending past the node, and in nodes where main line for communication between a main station and anyone of the out stations at the ends of the branch lines.

Some embodiments of the invention will now be described by way of a non limitative example, with reference to the accompanying drawings, wherein.

Figure 1:
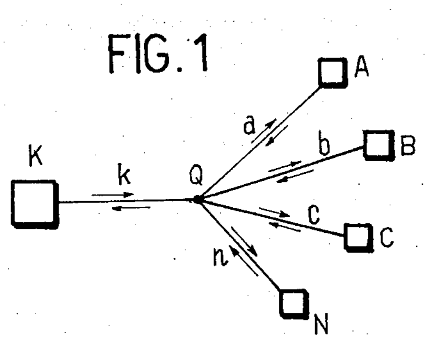
FIGS. 1 and 2 show two exemplary networks in which the coupler of the invention may be employed.

As shown in the drawing (FIG. 1), a network wherein the device according to the invention may be employed, consists of a main station K and of a plurality of peripheric stations A, B, C, — N, with bidirectional flowing of communications between the master station and one of the out stations. The carrier consists of a common line portion *k*, from the end Q whereof a number of secondary lines *a*, *b*, *c* — *n* branch off. Point Q forms the node wherein the device according to the invention is to be introduced.

Figure 2:
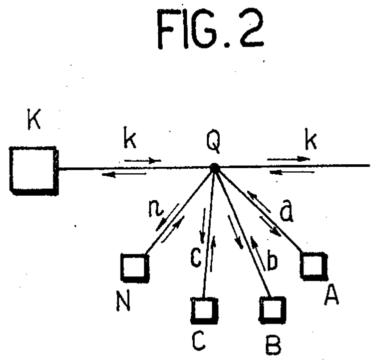

A second type of network to which the device of the invention may be applied is shown in FIG. 2; in this case the main line *k* passes through knot Q where the secondary lines *a*, *b*, *c*, — *n* branch off. In practice the extension of the main line *k* past the node Q is realized by means of one of the branch lines.

Figure 3:
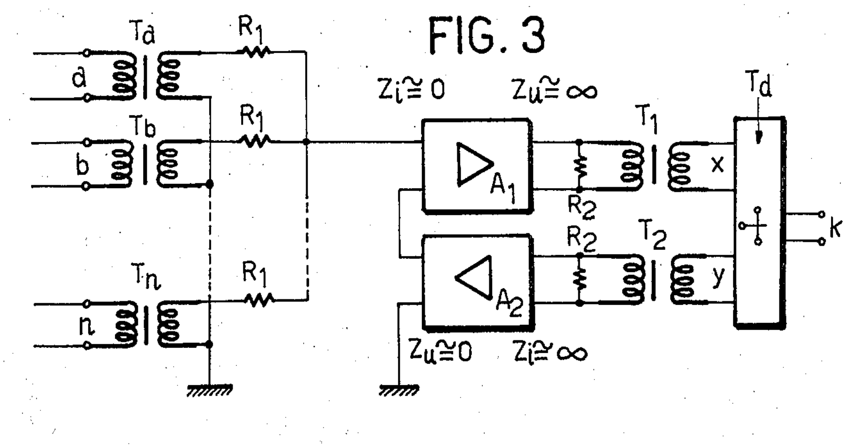
FIG. 3 shows a first embodiment of the coupler of the invention, suitable to be employed in a network such as that of FIG. 1.

FIG. 3 shows a first embodiment of the knot Q wherein the energy exchange between the branch lines and the main line occurs as a sum of currents in a point with a negligible impedance. The coupling device comprises a first amplifier unit $A_1$ whose input has a negligible impedance. A terminal of said input is connected, through the load resistors $R_1$ and a number of transformers T*a*, T*b* ... T*n* (if any), to the branch lines *a*, *b* — *n*. The output of amplifier unit $A_1$ is connected, through a transformer $T_1$ with load resistor $R_2$, to the branch *x* of a hybrid T*d* and then to the main line *k*. A second input terminal of unit $A_1$ is connected with the output, at negligible impedance, of a second amplifier unit $A_2$, the input whereof is in turn connected, possibly through a transformer $T_2$ with load resistor $R_2$, to the branch *y* of hybrid $T_d$.

Amplifier unit $A_1$ is intended for transmission from the branch lines towards the main line, and unit $A_2$ is intended for the opposite direction of transmission.

Figure 4:
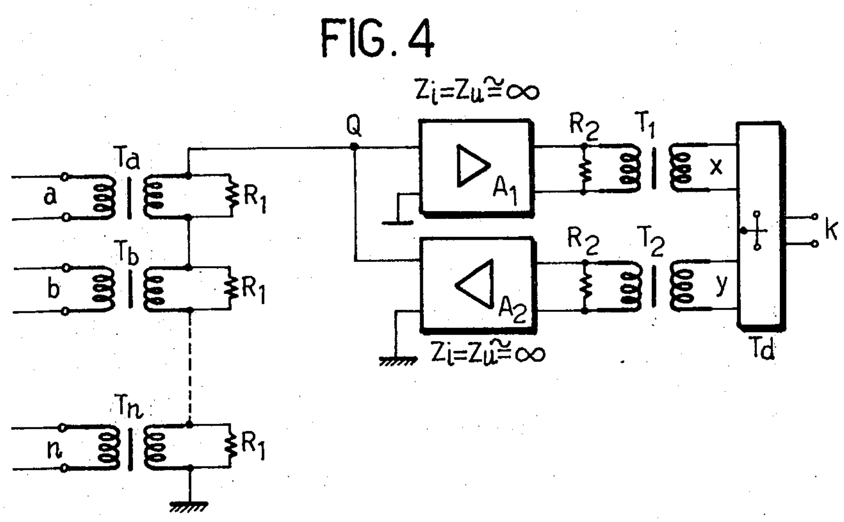
FIG. 4 shows a second embodiment.

FIG. 4 shows a second embodiment of the invention, in which the energy exchange occurs as a sum of voltages in a point with very high impedance.

In this embodiment the input of $A_1$ and the output of $A_2$ have very high impedance, and are connected in parallel. Branch lines *a*, *b*, *c*, — *n* are connected to the device as many through as many transformers T*a*, T*b* — T*n*, whose windings connected to the device are connected in series with one another and are individually loaded by the respective resistances $R_1$. One end of this series is connected to the said point of very high impedance. The connection between the amplifiers and the hybrid are similar to those shown in FIG. 3.

From the diagrams of FIGS. 3 and 4 it appears that the impedances of all lines afferent to the device are correctly matched, since each of them is loaded by resistors $R_1$ or $R_2$ through its own transformer which may be chosen depending on the nominal impedance of the line itself; that any energy exchange between the branch lines is impossible, and therefore any impedance change in one or more branch lines doesn't affect the transmission equivalent between the main line and the remaining branch lines and that the transmission equivalent in both directions depends upon the gain of amplifier unit $A_1$ and $A_2$.

These devices however have the disadvantage that there is an energy reflection from $y$ towards $x$. In fact, in the device of FIG. 3, when amplifier unit $A_2$ transmits towards the branch lines, a current directly proportional to the number of lines is generated in $A_1$, and in the device of FIG. 4, when $A_2$ supplies the branch lines with current, a voltage proportional to the sum of the impedances of the branch lines is generated at the input of $A_1$.

As is evident, the energy reflection from $y$ towards $x$, which causes reflection on the main line $k$, is directly proportional to the number of branch lines, and therefore obliges to limit the number of said lines.

Figure 5:
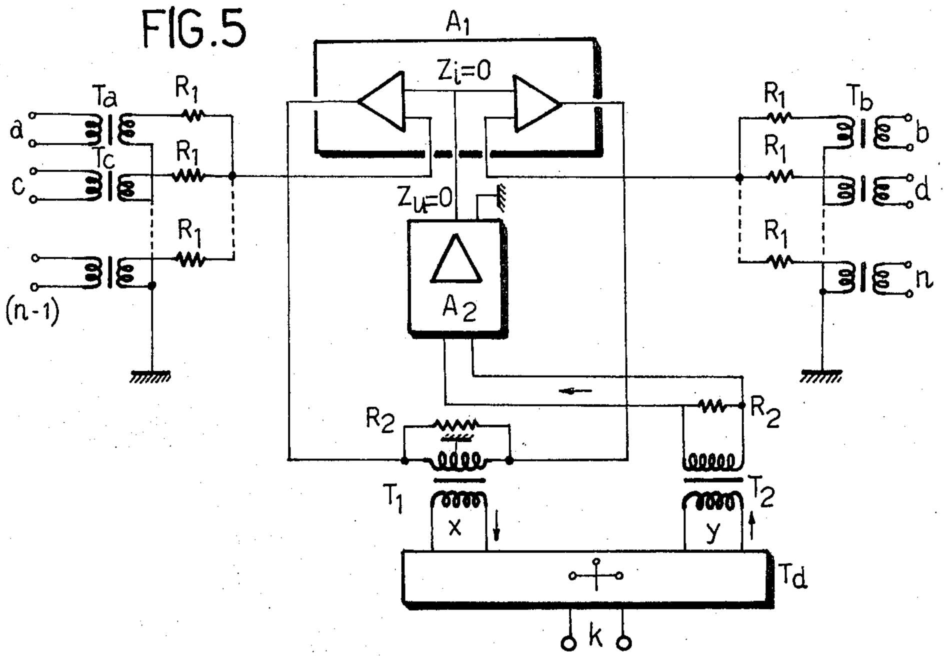
FIG. 5 is a modification of the device of FIG. 3.
Figure 6:
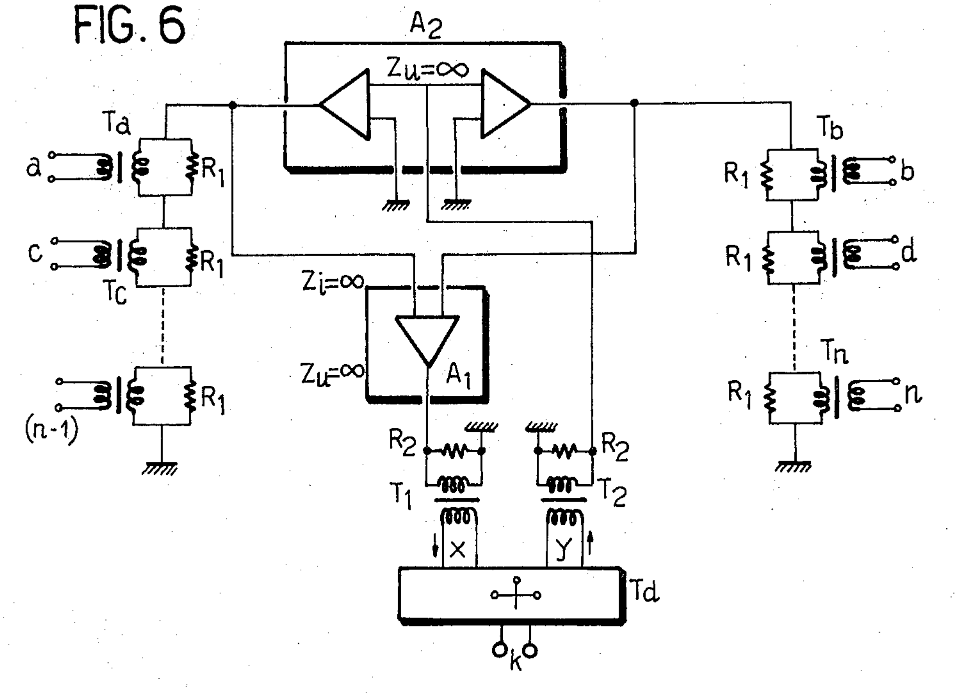
FIG. 6 is a modification of the device of FIG. 4.

In order to obviate to this drawback, the circuits of FIGS. 3 and 4 can be modified as shown in FIGS. 5 and 6 respectively.

In these figures there is shown that the branch lines are divided into two symmetrical groups. In FIG. 5 there is shown also that the amplifier unit $A_1$ has two symmetrical outputs connected possibly through a transformer, to the branch $x$ of the hybrid; branch $y$ thereof is connected to the input of amplifier unit $A_2$, which has the output, with negligible impedance, connected in series with the inputs of the symmetrical amplifier unit $A_1$.

In the circuit of FIG. 6, the amplifier unit $A_1$ consists of a differential amplifier to the inputs of which the two groups of branch lines are connected, whereas the output of said amplifier is connected to the branch $x$ of the hybrid. The branch $y$ of said fork is connected to the input of a symmetrical amplifier unit $A_2$, whose outputs, of very great impedance, are in turn connected to the two groups of branch lines.

By using the circuits of FIG. 5, 6 the reflection from $y$ towards $x$ is practically zero, except in case of an alteration of the impedance in one or more branch lines, is which case it is proportional to the unbalance between the two branches of the symmetrical circuit.

Moreover, by avoiding energy reflection from $y$ towards $x$ it is possible, at least theoretically, to have no limitations in respect of the number of branch lines, provided that this number is even and is distributed in equal parts in the two branches of the circuit. In practice however the device may be used for 10 – 12 branch lines as a maximum.

Figures 7, 8:
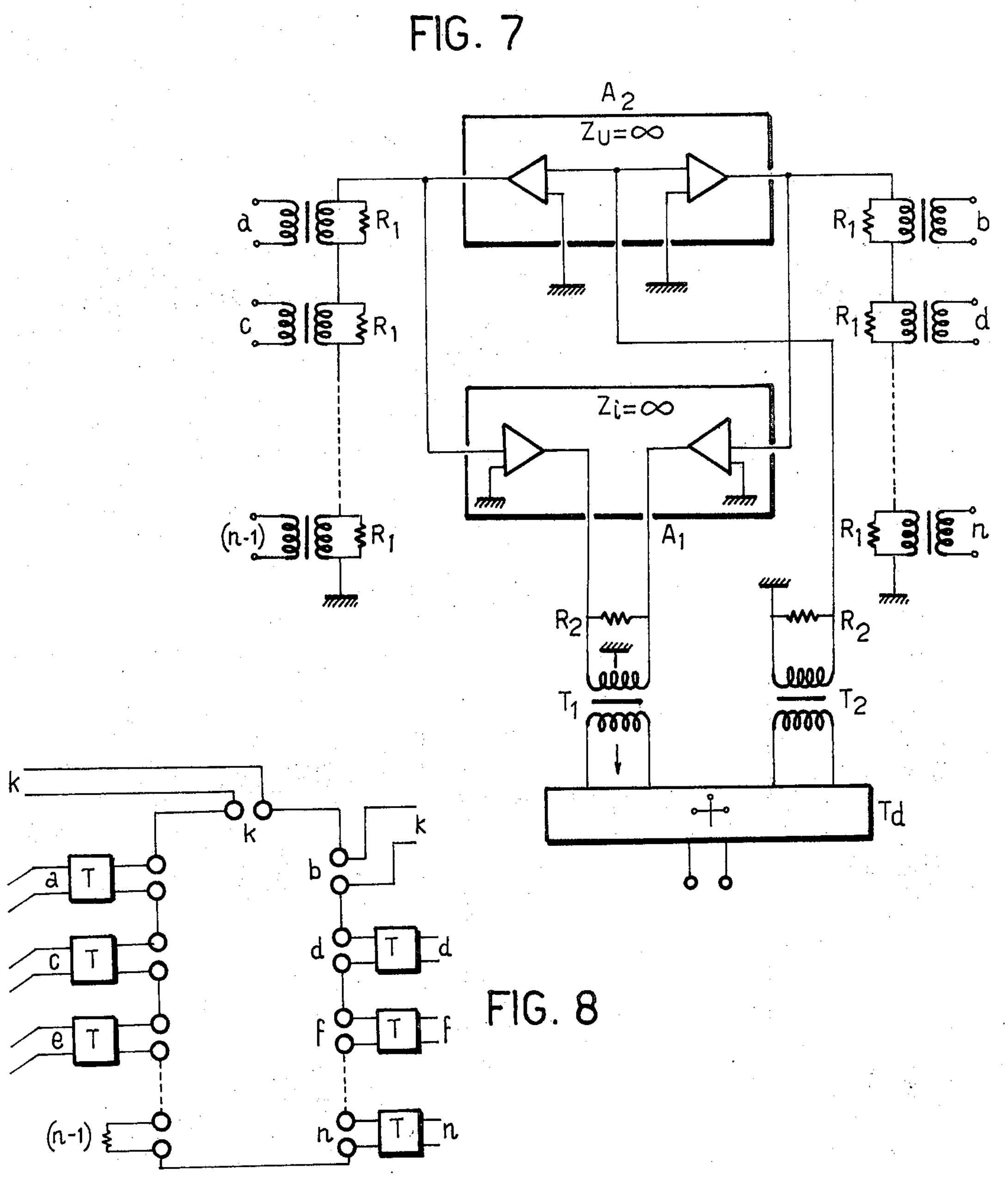
FIG. 7 is a modified embodiment of the circuit of FIG. 6.
FIG. 8 shows a device suitable to be employed in a network such as that of FIG. 2.

In the modified embodiment shown in FIG. 7, the differential amplifier of the circuit of FIG. 6 is replaced by a symmetrical amplifier having both inputs of very great impedance, and having the outputs connected to the balanced primary of a transformer for connection to the hybrid, or directly connected to the suitably balanced winding of one of the two transformers of the hybrid.

The same characteristics of transmission and stability may be obtained by increasing the gain of the active portion and by inserting in each branch line an attenuator having the same value as the gain increase. In this way a line privileged with respect to the others may be chosen among the various branch lines, on which line the attenuators is not inserted: such a privileged line forms, together with the main circuit, a line in transit having zero equivalent. The diagram of FIG. 8 shows this possible embodiment. The same effect obtained by inserting attenuators, may be obtained also by modifying the equivalent of the non privileged branch lines, for instance by properly dimensioning the impedance ratio of the transformers and the load resistors in every branch line.

The device according to the invention has been disclosed hereinbefore with reference to a two wires line, but it may be readily modified to suit four wire lines.

It is also self evident that the above description has been given by way of a non limitative sample, and that variants and modifications can be made without departing from the scope of the invention. Thus, for instance, the attenuators of FIG. 8 may be different from one another.

What is claimed is:

1. An active coupler for nodes of bidirectional transmission lines, where a plurality of branch lines branches off a main line, which coupler comprises first and second amplifier units, said first unit being intended for transmission from any one of the branch lines towards the main line and said second unit being intended for transmission in the opposite direction; said first amplifier unit having an input connected to the branch lines and an output connected to a first branch of a hybrid for connection to the main line; said second amplifier unit having an input connected to a second branch of said hybrid; the input of said first amplifier unit and the output of said second amplifier unit being connected in parallel and having a very high impedance, thereby realizing a point of very high impedance which provides for the decoupling between the branch lines; the energy exchange between any one of the branch lines and the main line occurring as a sum of electrical voltages.

2. The coupler according to claim 1, wherein the branch lines are divided into two symmetrical groups; and wherein said first amplifier unit consists of a differential amplifier and said second amplifier unit consists of a symmetrical amplifier; said first amplifier unit having two input terminals respectively connected to one of the groups of branch lines and an output connected to a branch of the hybrid coil; said second amplifier unit having the input connected to the second branch of the hybrid coil and two symmetrical output terminals connected in parallel with the input terminals of said first amplifier unit.

3. The coupler according to claim 1, wherein the branch lines are divided into two symmetrical groups; and wherein said two amplifier units consist of symmetrical amplifiers, said first unit having two input terminals respectively connected to one group of branch lines and the output connected to a branch of the hybrid coil; said second unit having the input connected to the other branch of the hybrid and two output terminals connected in parallel to the input terminals of said first unit, the output terminals of said second unit and the input terminals of said first unit having a very high impedance.

* * * * *